July 16, 1957 G. A. LYON 2,799,539
WHEEL COVER
Filed May 8, 1953 2 Sheets-Sheet 1
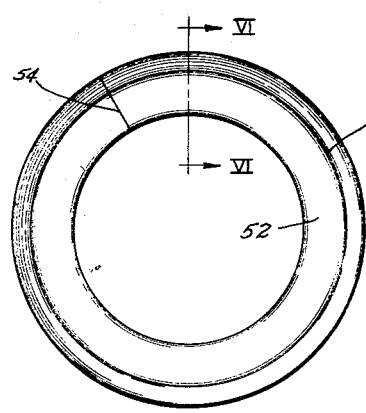
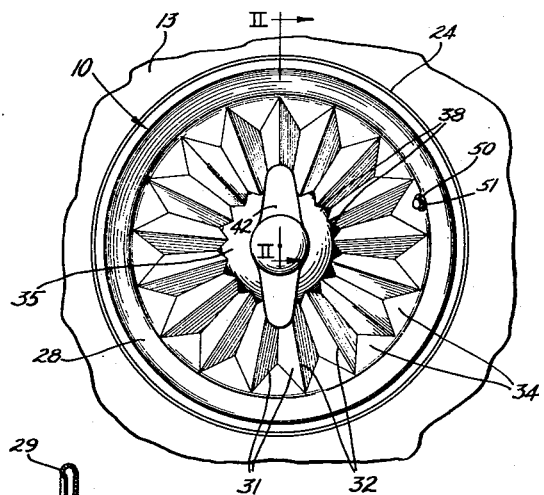
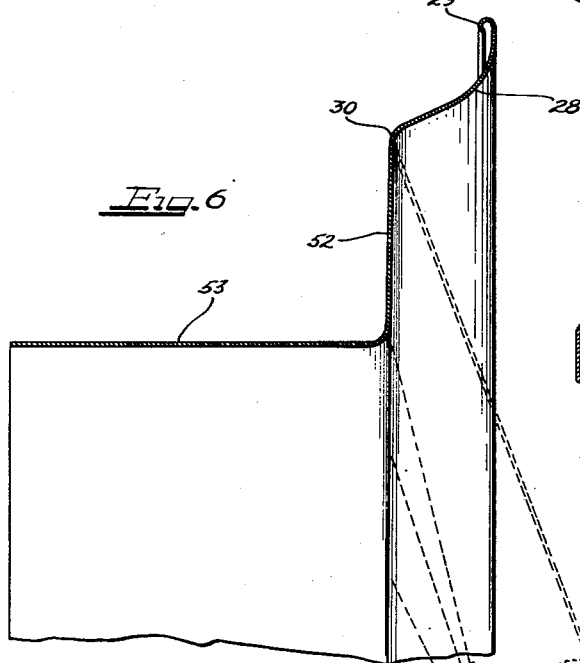
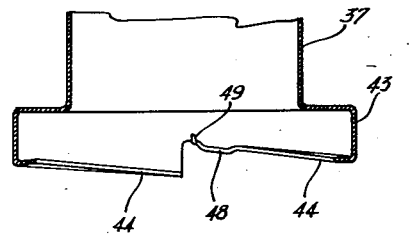
Inventor
GEORGE ALBERT LYON

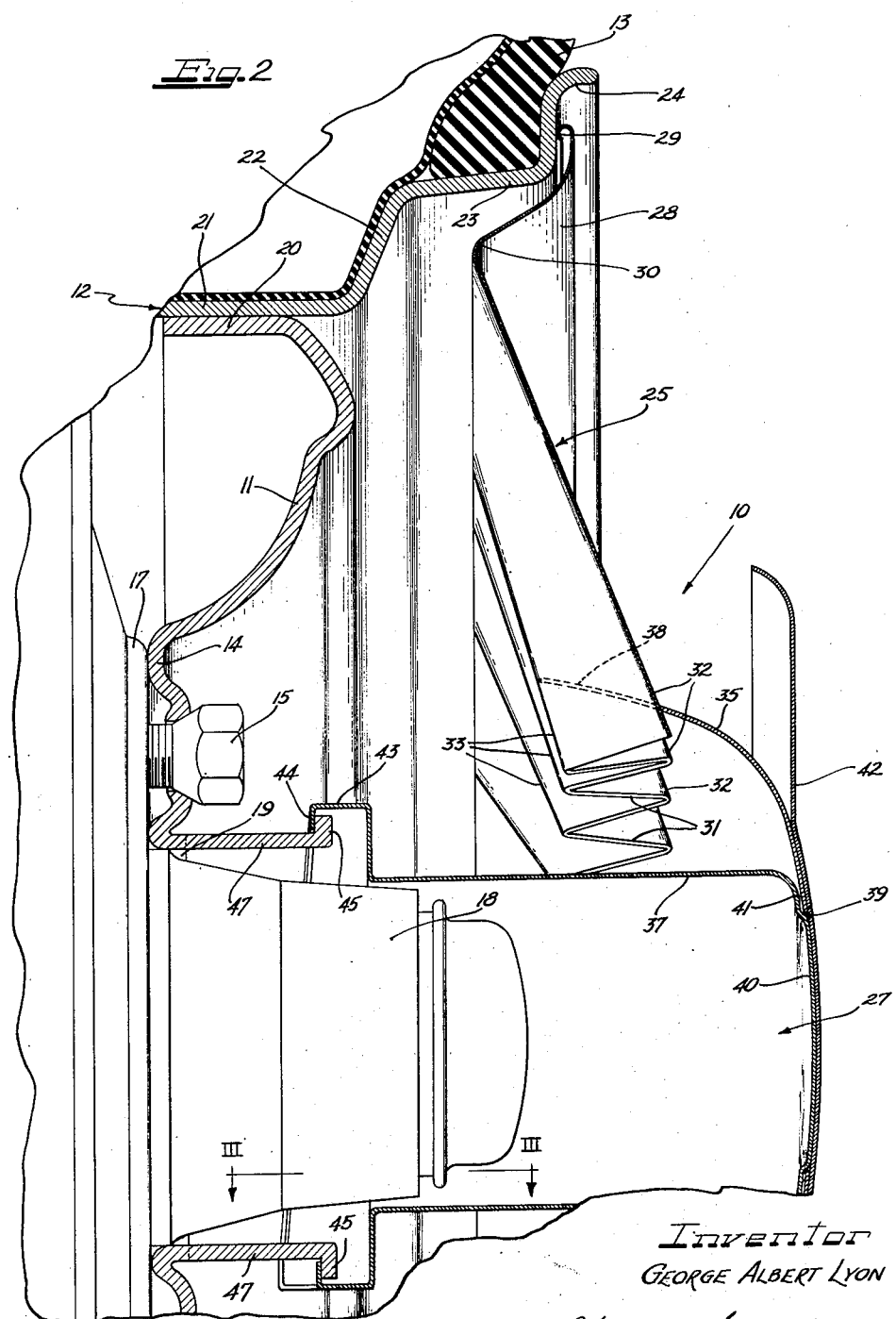

United States Patent Office 2,799,539
Patented July 16, 1957

2,799,539

WHEEL COVER

George Albert Lyon, Detroit, Mich.

Application May 8, 1953, Serial No. 353,710

4 Claims. (Cl. 301—37)

The present invention relates to improvements in the ornamental and protective covering of the outer sides of vehicle wheels.

An important object of the present invention is to provide an improved wheel structure having novel protective and ornamental covering means on the outer side thereof.

Another object of the invention is to provide an improved wheel cover.

A further object of the invention is to provide a novel method of making the wheel cover.

Other objects, features and advantages of the present invention will be readily apparent from the following detailed description of a preferred embodiment thereof taken in conjunction with the drawings, in which:

Figure 1 is an outside face elevational view of a wheel structure embodying features of the present invention;

Figure 2 is an enlarged fragmentary generally radial sectional view taken substantially on the line II—II of Figure 1;

Figure 3 is a reduced scale fragmentary sectional detail view of the cover retaining device being substantially on the line III—III of Figure 2;

Figure 4 is a plan view of a metallic blank from which the annulus component of the cover assembly is adapted to be made;

Figure 5 is a plan view of the blank after a rolling and welding operation; and

Figure 6 is an enlarged transverse sectional detail view taken substantially on the line VI—VI of Figure 5.

Referring to Figures 1 and 2, a cover assembly 10 according to the present invention is adapted to be applied in ornamental and protective relation to the outer side of a vehicle wheel comprising a body portion or spider 11 and a tire rim 12 of the multi-flanged drop center type adapted to support a pneumatic tire and tube assembly 13. The wheel body 11 may comprise a heavy gauge sheet metal disk stamping while the tire rim 12 may comprise a heavy gauge sheet metal rolled section.

For attachment of the wheel to a vehicle, the body 11 is provided with a central dished bolt-on flange 14 which is attachable by means of suitable screws or bolts 15 to a flange 17 carried rotatably upon a hub member 18 of a vehicle axle structure. A central generally axially outwardly directed annular flange 19 on the bolt-on flange 14 defines an aperture through which the hub 18 projects in the assembly.

At its outer margin the wheel body 11 is provided with an axially directed flange 20 attached in suitable manner to a base flange 21 of the tire rim. From the outer side of the base flange 21 of the tire rim extends a generally radially and axially outwardly directed side flange 22 merging with a generally axially outwardly and radially outwardly sloping intermediate flange 23. The outer side of the intermediate flange merges with a generally radially outwardly and then axially outwardly directed terminal flange 24.

It will be appreciated that the outer side of the wheel when uncovered presents a rather unattractive appearance and, further, it is desirable to protect the outer side of the wheel against road dirt, gravel damage, etc., especially in the area thereof adjacent the hub and the bolt-on flange. To this end, the cover assembly 10 is applied to the outer side of the wheel. The cover comprises an annular wheel body and tire rim covering member 25 and a central covering and retaining structure 27. These structures or portions of the cover assembly are cooperatively related for mutual tensioning or tightening reaction in mounted association with the wheel.

In the preferred form, the annular cover component 25 comprises a sheet metal structure of substantial inherent resilience and may be made from stainless steel or brass adapted to be plated, polished or otherwise suitably attractively finished. At its radially outer margin the annular cover component is provided with an annular generally rib-like preferably concave-convex portion 28 dimensioned to overlie the inner portion of the terminal flange 24 and having an underturned reinforcing and finishing marginal extremity flange 29 engaging the tire rim terminal flange. From its outer edge the annular cover portion 28 extends generally radially and axially inwardly in spaced adjacency to the juncture between the intermediate flange 23 and the terminal flange 24 to a position, in the assembly with the wheel, opposite the intermediate flange 23, and terminating at its inner extremity in a reversely directed narrow annular reinforcing juncture rib 30 facing generally axially inwardly intermediate the outer annular marginal portion 28 and the major radially inner portion of the annular cover member 25.

Substantial tensionable resilience coupled with adequate stiffness and reinforcement for service requirements is afforded in the major inner annular portion of the cover member 25 by a preferably generally radially uniformly corrugated formation comprising, as shown, a series of generally accordion-pleat-like radially extending ribs 31 provided with relatively hingedly connected divergently related side wall panels connected along longitudinal outer ridge-like junctures 32 and similar shorter inner longitudinal rib-like junctures 33. At their inner extremities, the side panels of the ribs 31 are disposed on a predetermined fairly small diameter and substantially closer together than at the radially outer extremities of the ribs. However, by having the inner end portions of the rib side panels flaringly disposed a reasonable range of axial flexing of the inner end portion of the cover annulus is enabled by substantially accordion pleat action of the rib walls.

As best seen in Fig. 2, the ribs 31 of the cover annulus extend in generally frusto-conical radially inwardly and axially outwardly sloping relation from the juncture with the annular outer marginal portion 28 of the cover annulus. At such juncture, the radially outer end of the outer straight rib peaks 32 merge into the intermediate reinforcing rib 30. On the other hand, the inner straight, shorter ridges 33 of the ribs extend from generally triangular spacer flange portions 34 extending radially inwardly, in the present instance in a common plane, from the juncture rib 30. Thereby uniform spacing and reinforcement is afforded for the outer end portions of the ribs 31. The result is a pleasing sunburst effect as best seen in Fig. 1.

Retention of the cover annulus 25 on the wheel through the medium of the central cover and retaining portion 27 is effected by engaging the inner end portions of the ribs 31 by means of a cap member 35 connected to an attachment hub member 37 releasably attachable to and removable from the wheel. By preference, the retaining cap 35 is of generally inverted cup shape having the outer marginal flange portion provided with a uniform series of serration-like projections 38 generally complementary to and reasonably closely fitting within the inner end portions of the outwardly opening grooves defined between the several accordion pleat ribs 31 of the annular cover member.

Connection to the cap member 35 and the inner hub member 37 is such that the hub member can be turned relative to the cap member. To this end, the cap member 35 has a central aperture 39 through which extends a boss-like bulge portion 40 of the hub member 37 defined about its margin by generally axially outwardly facing shoulder 41 opposing the inner side of the inner margin of the cap 35. Fixedly secured to the central boss portion 40 is a diametrically extending, two ear handle 42 opposing the shoulder 41 and thereby retaining the inner margin of the cap 35 in axial assembly with the hub member 37 but enabling relative rotation of the hub member and the handle 52 relative to the cap.

Herein the hub member 37 is constructed as a hollow, generally cup-shape elongated tubular member of a diameter to fit in substantial spaced relation concentrically through the aperture defined by the inner margin of the cover annulus 25 and to fit about the outer end portion of the wheel axle hub 18. At its inner end portion the hub shell 37 is provided with a retaining flange structure 43 having a pair of inturned retaining cam flanges 44 engageable with radially outwardly directed engagement lugs 45 of generally axially outwardly extending retaining extension finger projections 47 from the central aperture defining flange 19 of the wheel body. The construction and relationship of the hub member 37 and more particularly the flanges 43 and 44 thereof is such with respect to the retaining lugs 45 that by rotary movement of the cup 37 through the medium of the handle 42, retaining engagement with the retaining lugs 45 and disengagement can be effected.

As best seen in Fig. 3, the inner end portions of the retaining cam flanges 44 are preferably provided with retaining interlock depressions 48 and angular stop flanges 49 engageable with the retaining lugs 45 of the wheel body.

In applying the cover 10 to the wheel, the reinforcing flange extremity 29 of the cover annulus 25 is applied to the terminal flange 24 of the tire rim, with the marginal annular portion 28 disposed to register a valve stem opening 50 therein with a valve stem 51 of the tire and tube assembly. Then the hub member 37 is engaged with the retaining lugs 45 which by coaction with the cam flanges 44 as the hub member 37 is turned by means of the handle 42, cause the retaining assembly 27 to be drawn axially inwardly toward the wheel. This draws the retaining cap member 35 firmly against the inner marginal portion of the flexible ribs 31 of the annular cover member and applies flexing pressure axially inwardly thereagainst. At the same time the flexible reaction of the slightly inwardly deflected ribs 31 works axially outwardly against the retaining structure 27 to assure tight interengagement of the retaining lugs 45 in the interlock depressions 48 of the retaining flanges 44. Intentional removal of the cover can be easily effected by turning the handle 42 and thereby the hub member 37 until disengagement from the retaining lugs 45 is effected so that the retaining and central closure portion 27 of the cover can be axially withdrawn from the wheel and the thereby released annular cover member 25 can be removed from the wheel.

The annular cover member 25 is adapted to be efficiently and economically made from a rolled section derived from strip sheet material such as shown in Figure 4 and identified as S. The strip material S may be supplied either in individual strips, or in a substantially continuous roll of substantial length from which successive predetermined cover annulus sections may be derived in a more or less continuous forming process.

As the initial step in the process of making the cover annulus the strip S of proper width is shaped as by rolling the same into annular form, with the outer marginal generally concave convex cross-section portion 28, the underturned marginal reinforcing and finishing flange 29, and the intermediate reinforcing juncture rib 30 in substantially their ultimate shape. At this stage, a radially inwardly extending flat flange 52 extends from the juncture rib 30 and merges with a cylindrical, and in this instance axially inwardly directed flange 53. The ends of the thus formed strip are secured together as by a weld joint 54.

The completed ring may then be polished, plated and polished, or burnished to afford a highly lustrous finish.

Finally, the flange 53 and appropriate portions of the flange 52 are bent and radially creased and folded from the full line condition shown in Figure 6 to the dash outline condition to provide the flexible accordion pleat ribs 31. Since, in accomplishing this, the metal of the flange 53 and the portions of the flange 52 that are displaced in the formation of the ribs 31, is molded instead of stretched, virtually no disturbance or alteration of the outer surface finish will occur as the cover annulus is completed. This is important for mass production purposes.

It will be understood that modifications and variations may be effected without departing from the scope of the novel concepts of the present invention.

I claim as my invention:

1. In a wheel structure including a tire rim and a wheel body, a cover for disposition at the outer side of the wheel comprising an annular cover member having an annular outer marginal portion engageable with the tire rim and an inner generally radially fluted marginal portion, and a retaining and central closure structure including means for attachment to the wheel and a portion with an edge complementary to and interlockingly interengaging with said fluted inner portion of the annular cover member.

2. In a wheel structure including a tire rim and a wheel body, a cover for disposition at the outer side of the wheel comprising a cover annulus having an outer annular portion engageable with the tire rim and an inner annular regularly fluted portion, and means for closing the center of said cover annulus and retaining the same in position on the wheel comprising a central rotary member engageable retainingly with the wheel body and a cap member carried by the rotary member in relatively rotatable relation and having a margin complementary to and retainingly engageable in relatively non-rotatable relation with the fluted inner margin of the inner annular cover portion.

3. In a cover assembly for disposition at the outer side of a vehicle wheel, an annular cover member comprising an outer annular continuous rib-like portion and an inner relatively flexible and generally radially fluted portion, and a central retaining structure including a cap portion having a margin formed with a serration-like edge complementary to and retainingly engageable with the fluted inner portion of the annular cover member.

4. In a wheel structure including a wheel body and a tire rim supported thereby, with means on the wheel body for retaining engagement by a cover member in response to rotary movement of the cover member, a cover assembly for disposition at the outer side of the wheel including an annular cover member having a substantially rigid rib-like annular radially outer marginal portion engageable with the tire rim and having an inner flexible portion for overlying the wheel body, said annular cover member having a central aperture for disposition therethrough of a rotary member retainingly engageable with the retaining means on the wheel body in response to rotary movements of said of said rotary member, a handle on said rotary member, and a central cover member carried by said rotary member and disposed axially inwardly from said handle in relatively rotatable relation about said rotary member and arranged to be moved axially inwardly by pressure applied thereto incident to rotary engagement of said rotary member with said retaining means for thereby placing said inner flexible portion under compressive tension and thus thrusting said outer marginal portion firmly against the tire rim, said central cover member and the inner flexible portion of said annular cover member having separably interengageable generally axially extending interlock projection means thereon by which the central cover member and the annular cover member are maintained in relatively non-rotatable relation but permitting rotation relative thereto of said rotary member and said handle for applying or disengaging the cover assembly with respect to the wheel and whereby said annular cover member is enabled to remain in stationary relation upon the tire rim for maintaining registration of a valve stem through an aperture therein although the rotary member and handle are turned as aforesaid.

References Cited in the file of this patent

UNITED STATES PATENTS

| | | |
|---|---|---|
| 1,959,255 | Zerk | May 15, 1934 |
| 2,041,657 | Hight | May 19, 1936 |
| 2,124,789 | Lyon | July 26, 1938 |
| 2,159,881 | Booth | May 23, 1939 |
| 2,316,346 | Lyon | Apr. 13, 1943 |
| 2,358,984 | Lyon | Sept. 26, 1944 |
| 2,550,222 | Carlin | Apr. 24, 1951 |
| 2,639,948 | Grimshaw | May 26, 1953 |

FOREIGN PATENTS

| | | |
|---|---|---|
| 265,448 | Italy | June 14, 1929 |